(12) United States Patent
Tsutsumi

(10) Patent No.: US 8,705,883 B2
(45) Date of Patent: Apr. 22, 2014

(54) NOISE REDUCTION DEVICE AND NOISE REDUCTION METHOD

(75) Inventor: Norihiko Tsutsumi, Tokyo (JP)

(73) Assignee: Fujitsu Semiconductor Limited, Yokohama (JP)

( * ) Notice: Subject to any disclaimer, the term of this patent is extended or adjusted under 35 U.S.C. 154(b) by 1171 days.

(21) Appl. No.: 12/557,355

(22) Filed: Sep. 10, 2009

(65) Prior Publication Data

US 2010/0111413 A1    May 6, 2010

(30) Foreign Application Priority Data

Sep. 29, 2008   (JP) .................................. 2008-249946

(51) Int. Cl.
*G06K 9/40*   (2006.01)
(52) U.S. Cl.
USPC .......................................... 382/264; 382/254
(58) Field of Classification Search
USPC ................................................ 382/254–275
See application file for complete search history.

(56) References Cited

U.S. PATENT DOCUMENTS

| 5,343,283 A * | 8/1994 | van Dorsselaer et al. ..... 358/445 |
| 5,764,804 A * | 6/1998 | Yajima et al. ................. 382/238 |
| 6,226,051 B1 | 5/2001 | Beattie |
| 2003/0122969 A1 * | 7/2003 | Higuchi ........................ 348/607 |
| 2005/0212718 A1 * | 9/2005 | Nabeshima et al. ........... 345/3.3 |

FOREIGN PATENT DOCUMENTS

| JP | 07-184225 | 7/1995 |
| JP | 168740 | 6/1999 |
| JP | 2000-032300 | 1/2000 |
| JP | 2003-123063 A | 4/2003 |
| JP | 2003-259126 A | 9/2003 |

OTHER PUBLICATIONS

Office Action from JP 2008-249946 dated Sep. 4, 2012.

* cited by examiner

*Primary Examiner* — Alex Liew
(74) *Attorney, Agent, or Firm* — Arent Fox LLP

(57) ABSTRACT

A noise reduction device includes a line buffer that stores a blend value obtained by blending a pixel value stored in the line buffer with a processing target pixel value at a given ratio by an amount of one line of an image, and a selector that selects the blend value when a difference between the blend value in the line buffer and the target pixel value is less than a threshold, and that selects the target pixel value when the difference is greater than or equal to the threshold.

6 Claims, 7 Drawing Sheets

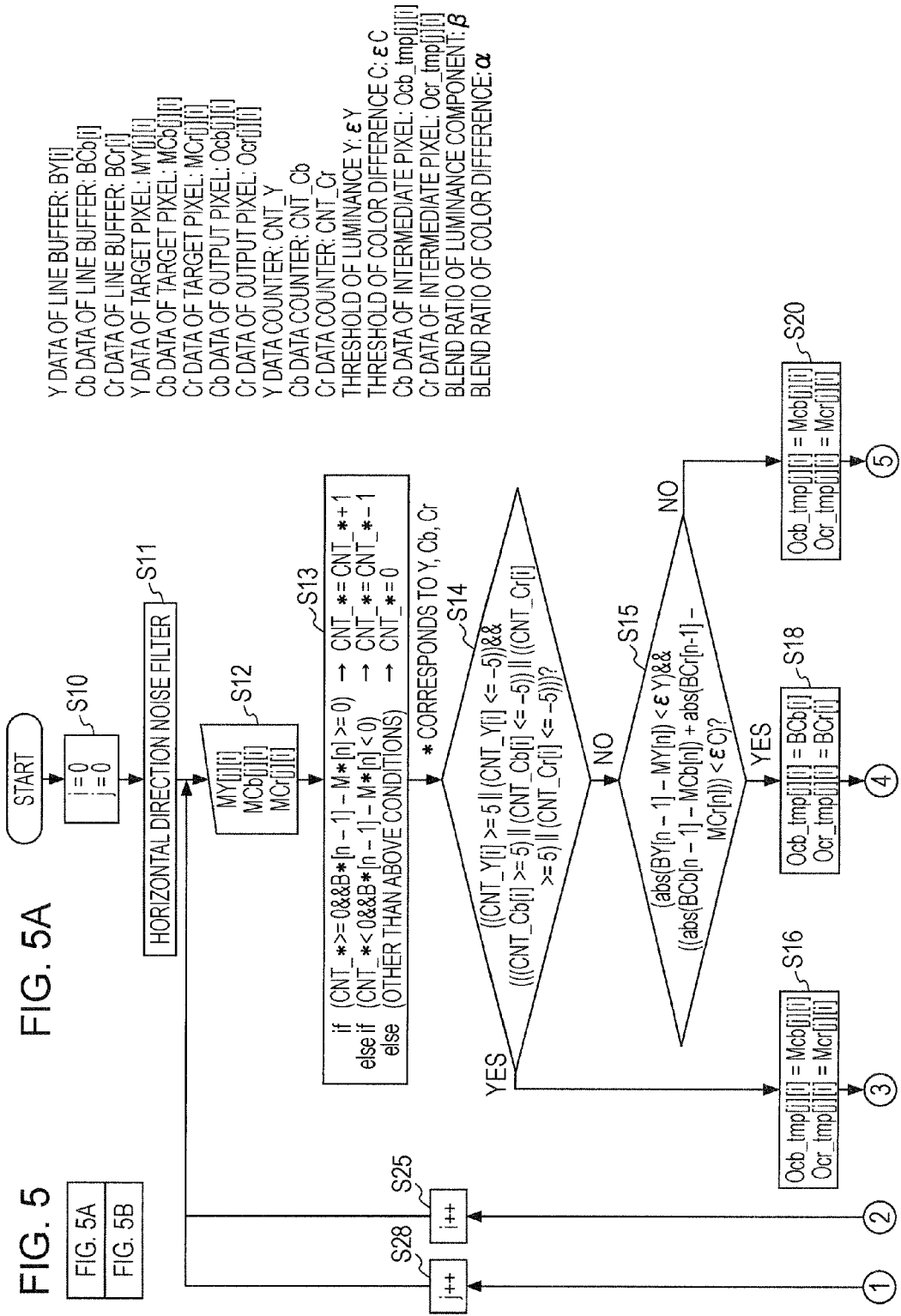

NOISE REDUCTION DEVICE AND NOISE REDUCTION METHOD

CROSS-REFERENCE TO RELATED APPLICATIONS

This application is based upon and claims the benefit of priority of the prior Japanese Patent Application No. 2008-249946, filed on Sep. 29, 2008, the entire contents of which are incorporated herein by reference.

FIELD

The application relates to a noise reduction device and a noise reduction method.

BACKGROUND

When an optical apparatus, such as a digital still camera or a scanner, generates a digital image, noise occurs in color components and, as a result, the image has roughness. In recent years, an optical device has also been mounted on a mobile product, such as a cellular phone, as a camera module, and has been used to provide a low-cost, small-area color noise filter circuit. With the progress of increasing the number of pixels for the camera module, a light amount and area per pixel have been decreasing.

It is known that color noise is more likely to occur when luminance to a subject is low, so it is presumable that a problem of color noise progressively occurs in the camera module. As such a low-cost, small-area color noise filter may provide benefit.

It is conceivable that a method of reducing color noise includes applying a typical filter, such as a low-pass filter, an $\epsilon$ filter, a median filter and a Laplacian filter. In order to optimally reduce color noise, it is conceivable that low-pass filter process or median filter process is carried out on pixels of about vertical 5 pixels by horizontal 5 pixels.

However, in terms of circuit implementation, a large memory space of about at least five lines in an image frame is required, so it is inappropriate for a mobile device, such as a recent cellular phone that requires low cost and small area.

In the existing art, Japanese Unexamined Patent Application Publication No. 2003-259126 discusses an image processing apparatus that reduces noise of an image and suppresses degradation of the image. Japanese Unexamined Patent Application Publication No. 2003-123063 discusses an image processing apparatus that is able to detect a color edge with a simple configuration and that carries out color noise reduction while preventing color bleeding.

An example of reducing color noise by executing low-pass filter process on pixels of about vertical 5 pixels by horizontal 5 pixels is illustrated in FIG. 1 and FIG. 2. A method is discussed in which, when the center of a block of vertical 5 pixels by horizontal 5 pixels is set as a target pixel, a mixture of peripheral pixels at a given rate is used as a color difference of the target pixel in the low-pass filter. However, as illustrated in FIG. 2, it is necessary to have a memory space for holding data corresponding to the necessary number of lines. If it is assumed that color noise filter is applied only in the horizontal direction of an image frame, there is no problem in terms of circuit implementation for applying a low-pass filter, an $\epsilon$ filter, a median filter, or the like, as long as buffers of the necessary number of pixels are present in the horizontal direction. However, when the color noise filter is applied only to pixels in the horizontal direction, the stripe of a color difference signal occurs in the horizontal direction. Thus, it is necessary to provide a method of executing color noise filter using pixels in the vertical direction. Applying the method described above, in order to carry out color noise filter process using the pixels in the vertical direction, it would be necessary to prepare line buffers of the necessary number of lines in the vertical direction. Therefore, a memory space for holding data of the necessary number of lines is required. Thus, cost and area problematically would increase in a mobile device, such as recent cellular phones, that requires low cost and small area.

SUMMARY

According to an aspect of an embodiment, a noise reduction device includes a line buffer that stores a blend value obtained by blending a pixel value stored in the line buffer with a processing target pixel value at a given ratio by an amount of one line of an image, and a selector that selects the blend value when a difference between the blend value in the line buffer and the target pixel value is less than a threshold, and that selects the target pixel value when the difference is greater than or equal to the threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
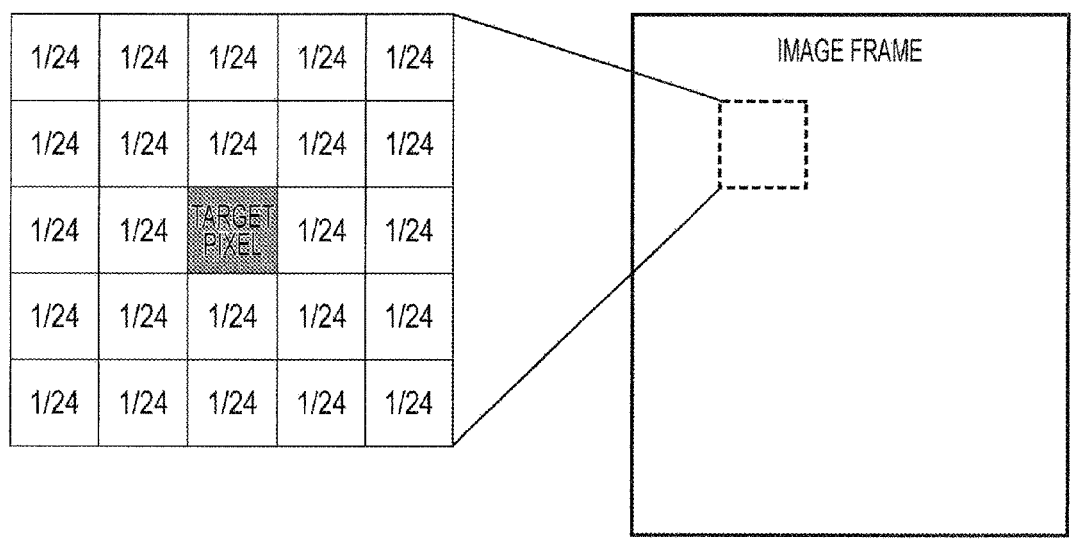
FIG. 1 illustrates an existing example of reducing color noise from pixels of about vertical 5 pixels by about horizontal 5 pixels by carrying out low-pass filter process.
Figure 2:
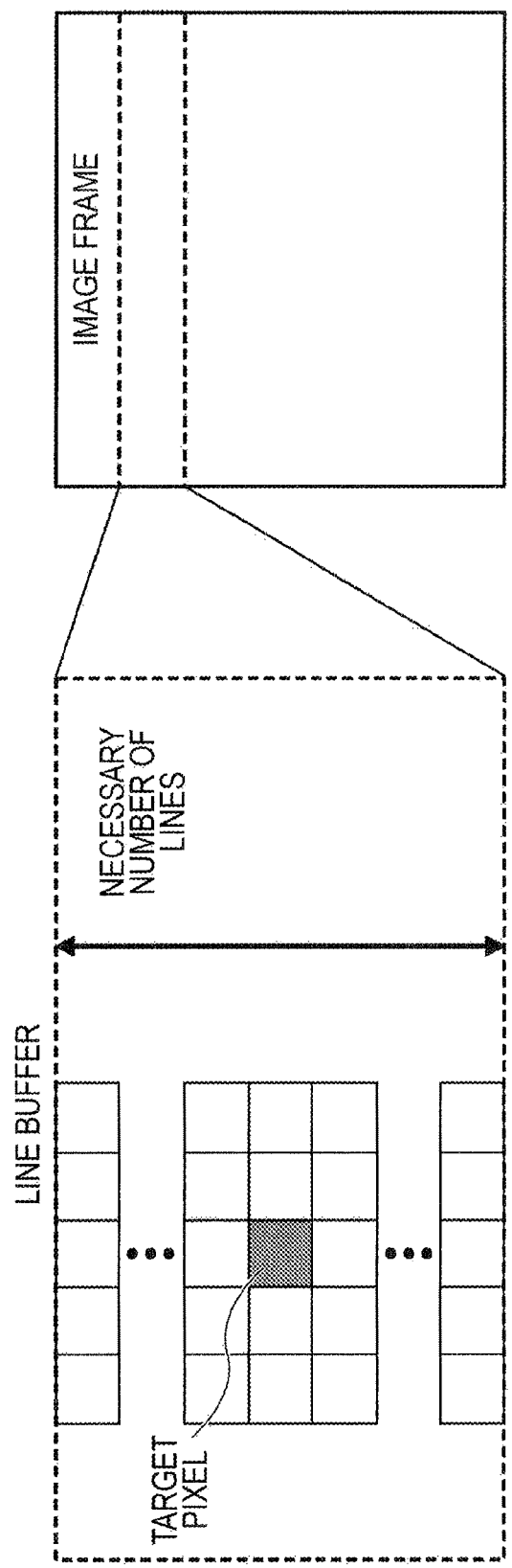
FIG. 2 illustrates another existing example of reducing color noise from pixels of about vertical 5 pixels by about horizontal 5 pixels by carrying out low-pass filter process.

An embodiment applies a method that is able to reduce color noise only by preparing a one-line line buffer that holds pixel data in the vertical direction. Here, the one-line line buffer includes three buffers that store three components, such as, Y component, Cb component, and Cr component. The line buffer stores a value that blends a value in the line buffer with a target pixel value at a given ratio. When a color noise filter is applied to the target pixel, such a method provides that the blend value is employed when the absolute value of a difference between the blend value in the line buffer and the target pixel value is less than a threshold, and the target pixel value itself is employed when the absolute value of the difference is greater than or equal to the threshold. By setting the threshold, the boundary of color difference signals is identified to prevent color mixing of color components around the boundary. Note that, if the blend value in the line buffer just stores a simply blended pixel value, color bleeding may occur around the boundary of the color difference signals. Thus, the method is provided in which the blend ratio is varied between two cases, that is, when the absolute value of a difference between the blend value in the line buffer and the target pixel value is less than a threshold and when the absolute value of the difference is greater than or equal to the threshold is employed. However, if this is directly employed, when pixels having a small variation in color difference signal are successively present, for example, when pixels that are around the boundary of color difference signals and that fall within a set threshold are successively present, color bleeding may occur in the vertical direction. Then, the function for counting the positive or negative direction of a difference between a blend value in the line buffer and a target pixel value is provided. Further, when the variation of a pixel value successively occurs in a given direction beyond the set number of times, the blend value in the line buffer is discarded and a new target pixel value is stored in the line buffer, thus making it possible to reduce color bleeding.

Furthermore, application of the above method may cause a color shift in each column. Therefore, pixel values from which noise is reduced in the vertical direction may be used to employ a method that applies, in the horizontal direction, a low-pass filter or a filter, or the like, described in Japanese Patent Application No. 2008-029812 according to a related art. Japanese Patent Application No. 2008-029812 uses pixels in a further wide range to reduce color noise to thereby approximate the color difference of the target pixel to a true value. By so doing, a color shift that occurs around the boundary of color difference signals may be reduced.

According to the present embodiment, by using one-line line buffer, a color noise reduction filter may also be applied in the vertical direction of image data. Thus, it may be possible to reduce line buffers for noise reduction, and to improve a reduction in area of LSI and cost performance. In addition, when a color noise reduction filter is configured only by using one-line line buffer, color bleeding has occurred. However, according to the present embodiment, it may be possible to reduce color noise in a state where color bleeding is reduced as much as possible.

Figure 3:
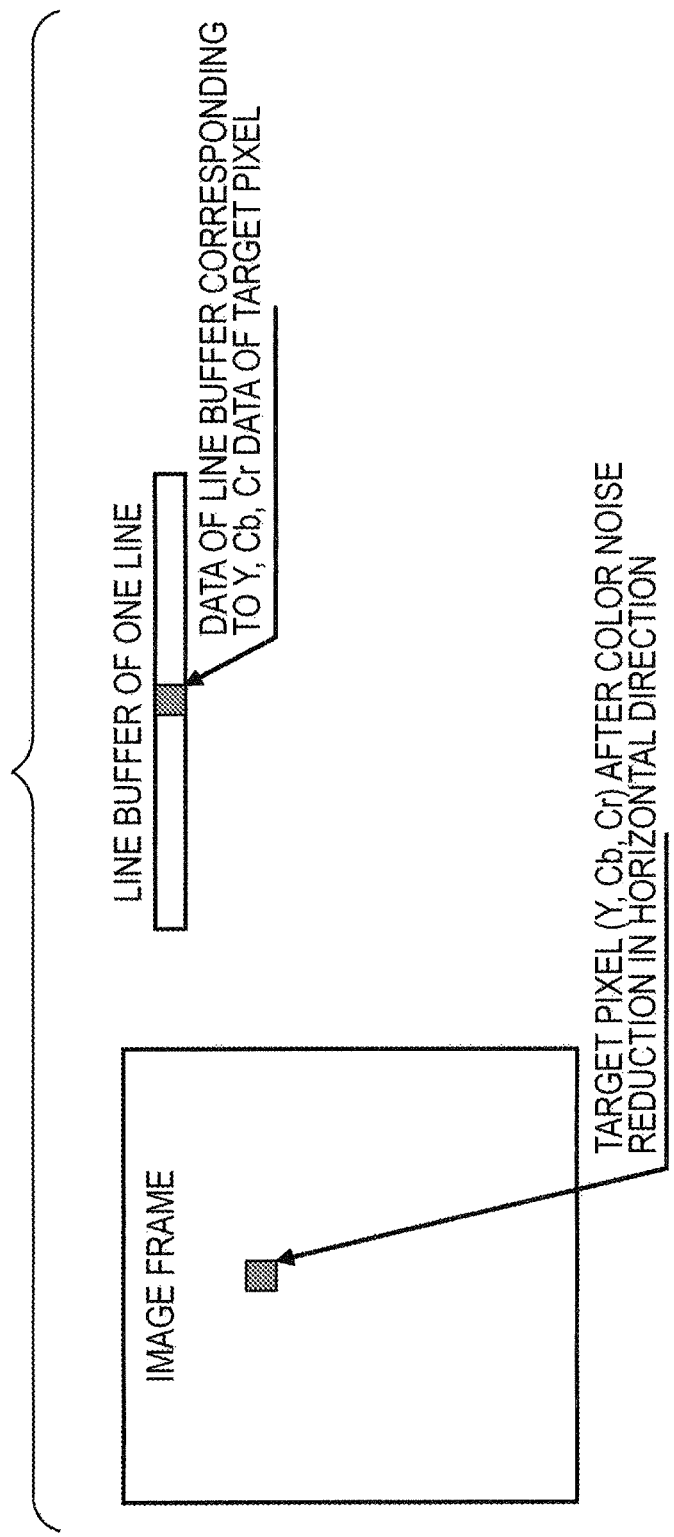
FIG. 3 illustrates an embodiment for reducing color noise.

FIG. 3 is a view that illustrates the embodiment for reducing color noise. FIG. 3 illustrates an example of a method that is able to reduce color noise when one-line line buffer is prepared in order to reduce the number of line buffers that hold image data in the vertical direction for an image frame. In the present embodiment, a process in the horizontal direction and a process in the vertical direction separately are considered. First, a color noise reduction method in the horizontal direction may apply a general filter, such as a low-pass filter, an ε filter, a median filter and a Laplacian filter, or the filter described in Japanese Patent Application No. 2008-029812. Each pixel, to which the color noise reduction method in the horizontal direction has been applied, is stored in the line buffer, for example, by luminance Y and color differences Cb and Cr. Further, the line buffer may store a value that is obtained by blending a value stored in the line buffer with a target pixel value at a given ratio. A blending method is, for example, a method called α blend. In the α blend, where the value of the target pixel is A and the value stored in the line buffer is B, the blend value is given as $\alpha A+(1-\alpha)B$. Here, α is real number greater than or equal to 0 and less than or equal to 1. As such, α depicts a blend ratio of two values.

When the absolute value of a difference between the blend value and the target pixel value is less than a threshold, the target pixel value is replaced with the blend value. When the absolute value of the difference is greater than or equal to the threshold, the target pixel value is used. In one aspect of the embodiment, the comparison with the threshold, the absolute value of a difference between the blend value and the target pixel value is compared with a threshold for luminance component, and the sum of the absolute value of a difference between the blend value and target pixel value of Cb and the absolute value of a difference between the blend value and target pixel value of Cr is compared with a threshold for color difference component. The luminance component and the color difference component are separately stored in the line buffer, so the thresholds are respectively set separately for luminance and color difference. Further, when it is determined that both fall within the threshold, the target pixel value is replaced with the blend value.

The blend ratio (the above α) of the target pixel and the line buffer value is varied in such a manner that it is determined whether the absolute value of a difference between the blend value and the target pixel value is less than the threshold or the absolute value of the difference is greater than or equal to the threshold. When the absolute value of the difference is less than the threshold, the ratio at which the target pixel is blended is decreased (for example, α=0.2, or the like). When the absolute value of the difference is greater than or equal to the threshold, the ratio at which the target pixel is blended is increased (for example, α=0.9, or the like). As such, this prevents color bleeding from occurring around the boundary of color differences. The correspondence with the line buffer is illustrated in FIG. 3.

In FIG. 3, when the pixels of the image frame are processed line by line, the blend values obtained up to the process line previous to the current process line are stored in the one-line line buffer. Data to be blended with the target pixel are stored at the position in the similar line buffer as the position of the processing target pixel in the one-line line buffer. The one-line line buffer is formed of three line buffers in order to store the Y component, Cb component and Cr component of each pixel.

Note that the luminance and color difference are used for determination with respect to the threshold, so is the method may be effective to a variation in luminance. It may be additionally noted, that the function of counting only the positive or negative direction of a difference between the pixel value of the line buffer and the target pixel value for each of the luminance component Y and color difference components Cb and Cr makes is possible to reduce color bleeding. As such, when the variation of a pixel value successively occurs in a given direction beyond the set number of times, the blend value in the line buffer is discarded and the target pixel value is stored. Furthermore, when the above method is applied, there is a possibility that a color shift may occur column by column. Therefore, pixel values from which noise are reduced in the vertical direction are used to undergo a method that applies a low-pass filter or a filter, or the like, such as described in Japanese Patent Application No. 2008-029812. By so doing, any color shift that may occur around the boundary of color difference signals is reduced.

Figure 4:
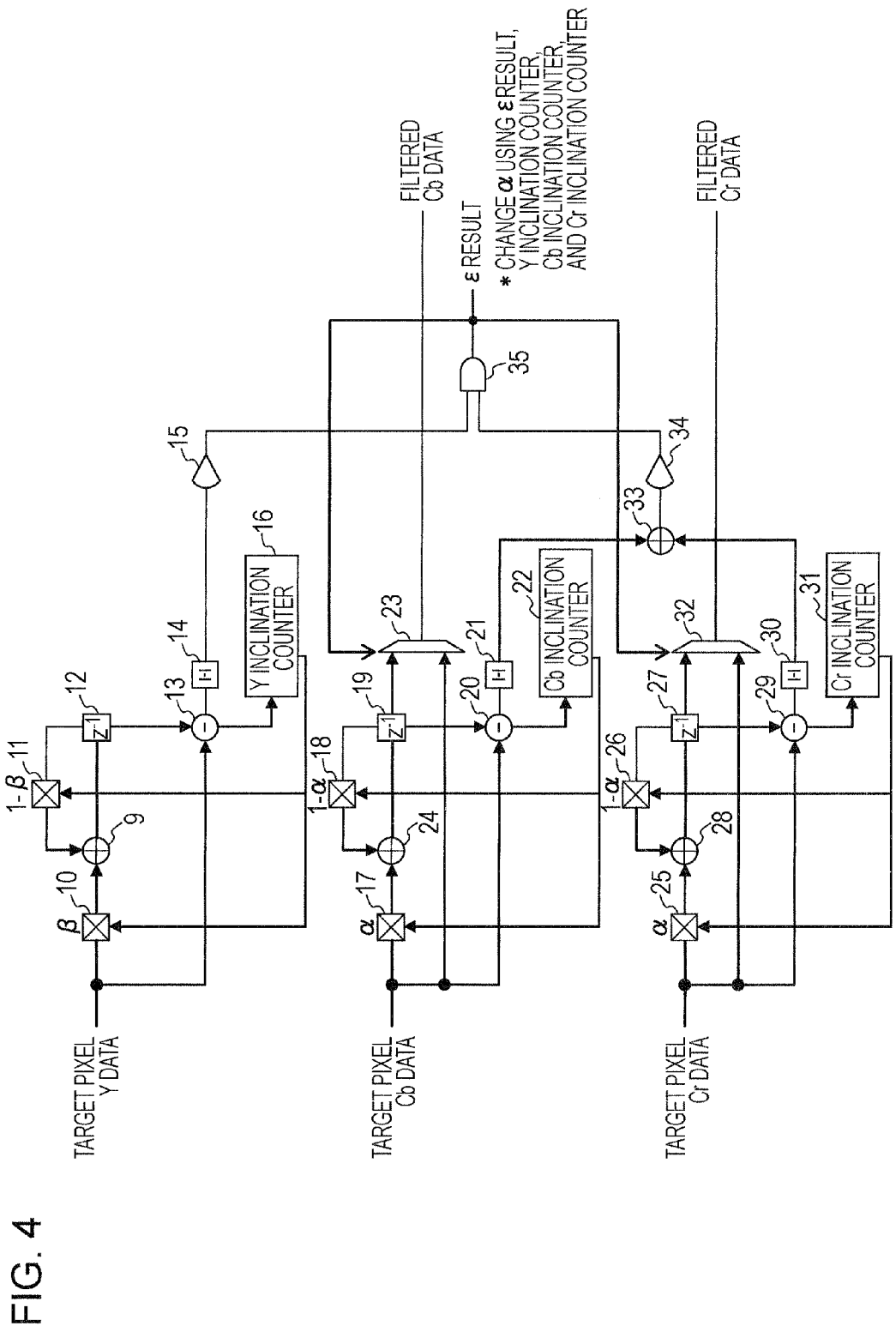
FIG. 4 illustrates a color noise reduction device according to one aspect of the embodiment.

FIG. 4 is a block diagram of a color noise reduction device according to the embodiment. In the depicted device, the Y data of the target pixel are multiplied by a blend ratio β at a multiplier 10, and is input to a block 12 that applies an IIR filter denoted by $Z^{-1}$. The data filtered by the IIR filter are multiplied by 1−β at a multiplier 11, and are blended with data before filtering at an adder 9. An output from an IIR filtering unit 12 becomes a blend value, and a difference with respect to the Y data of the target pixel is calculated at a subtracter 13. The differential data from subtracter 13 are converted into an absolute value at a block 14, and is compared with a threshold at an ε computing unit 15. In addition, a Y inclination counter 16 counts the number of times the differential data are positive or the number of times the differential data are negative, and controls the value of the blend ratio β. An output of the ϵ computing unit 15 is input to an AND circuit 35. Note that the following blend ratio α is variable; however, β, which is the blend ratio of the Y data, may be fixed. At this time, β is considered to be 0.25, or the like.

The Cb and Cr data of the target pixel are multiplied by the blend ratio α at multipliers 17 and 25, and are filtered by the IIR filter at IIR filtering units 19 and 27, and then multiplied by 1−α at multipliers 18 and 26, and finally blended with the value before filtering at adders 24 and 28. The blend values, which are outputs of the IIR filtering units 19 and 27, and the Cb and Cr data of the target pixel are subjected to subtraction at subtracters 20 and 29 to calculate differential data. The calculated differential data are converted into absolute values at blocks 21 and 30, added at an adder 33, and then compared with the threshold by an ϵ computing unit 34. An output of the ϵ computing unit 34 is input to the AND circuit 35. An output of the AND circuit 35 is input to selectors 23 and 32, and is used to select whether the blend value is output or the target pixel value is output as it is for Cr and Cb data. Cb inclination counter 22 and a Cr inclination counter 31 each count the number of times the difference between the blend value and the target pixel value is positive or the number of times the difference is negative, and accordingly control the values of the blend ratios α and β.

Figure 5B:
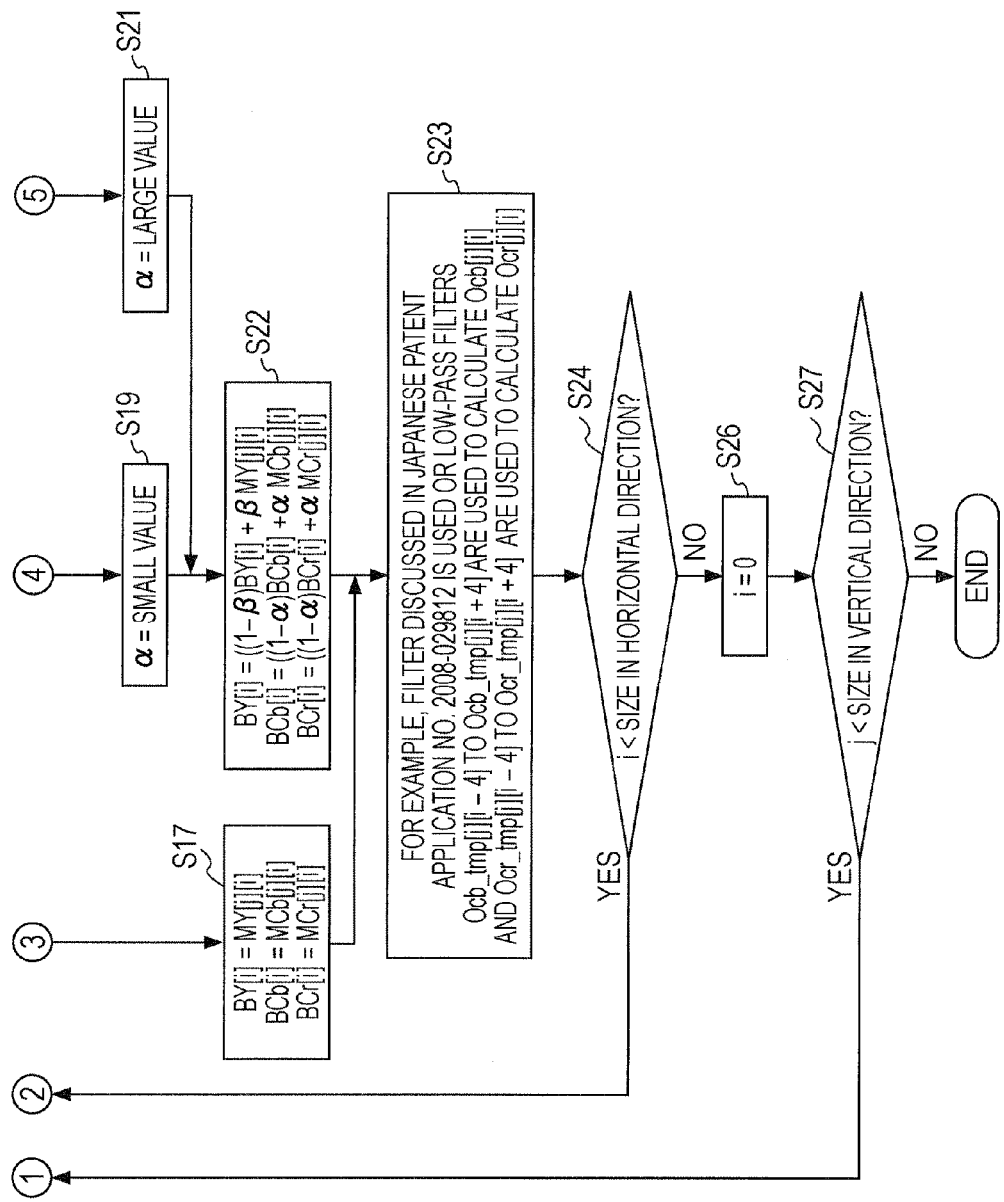
FIG. 5 illustrates a flowchart of the embodiment for reducing color noise.

FIG. 5 is a process flow of the present embodiment for reducing color noise. In operation S10, i and j are initialized to 0. In operation S11, the noise filter in the horizontal direction is applied to one line. In operation S12, data of the target pixel are loaded, such as the Y, Cb and Cr data. In operation S13, for Y, Cb and Cr, when the count value is greater than or equal to 0 and a value obtained by subtracting the target pixel value from the line buffer value is greater than or equal to 0, the count value is increased by one; conversely when the count value is less than 0 and the value obtained by subtracting the target pixel value from the line buffer value is less than 0, the count value is reduced by one; otherwise, the count value is reset at 0. In operation S14, it is determined whether the count value of Y is greater than a given value (here, 5 or −5) or the count value of Y is less than the given value and one of the count values of Cb and Cr is greater than the given value or one of the count values of Cb and Cr is less than the given value. When an affirmative determination is made in operation S14, the Cb and Cr values of the target pixel are set in a work area in operation S16, the target pixel is set to the line buffer in operation 517, and the process proceeds to operation S23.

When a negative determination is made in operation S14, it is determined in operation S15 whether the absolute value of a difference between the line buffer value of Y data and the target pixel value of Y data is less than a threshold ϵY and a value obtained by adding the absolute value of a difference between the line buffer value of Cb data and the target pixel value of Cb data and the absolute value of a difference between the line buffer value of Cr data and the target pixel value of Cr data is less than a threshold ϵC. When an affirmative determination is made in operation S15, the line buffer value is set in a work area in operation S18, α is set at a small value in operation S19, and the process proceeds to operation S22. When a negative determination is made in operation S15, the target pixel value is set in a work area in operation S20, α is set at a large value in operation S21, and the process proceeds to operation S22.

In operation S22, the blend value is set in the line buffer, and the process proceeds to operation 523. In operation S23, the data in the work area are used to apply filtering on four pixels on the sides of the target pixel, for example by using the filter described in Japanese Patent Application No. 2008-029812 or the low-pass filter. Thus, output data of the target pixel may be generated. In operation S24, it is determined whether the value of i is less than the horizontal size of the image. When an affirmative determination is made in operation S24, i is incremented by one in operation S25, and the process returns to operation S11. When a negative determination is made in operation S24, i is initialized to 0 in operation S26, and it is determined in operation S27 whether j is less than the vertical size of the screen. When an affirmative determination is made in operation S27, j is incremented by one in operation S28, and the process returns to operation S11. When a negative determination is made in operation S27, the process ends.

The counter in operation S13 is used to determine that a variation in color, which may not be smoothed, is present. Further, when a variation of data of the target pixel with respect to the data of the line buffer successively occurs a given number of times in the similar direction, the data of the target pixel is directly used as the output pixel value.

Figure 6:
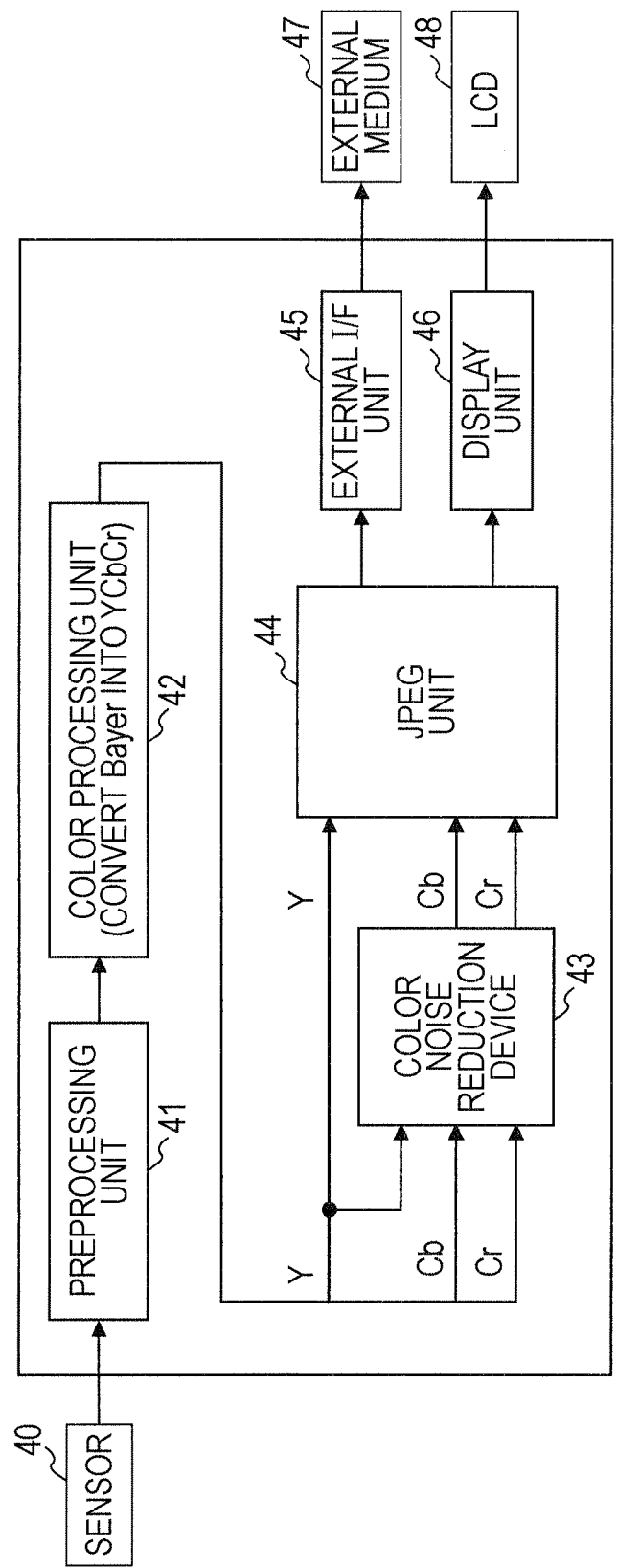
FIG. 6 illustrates a block diagram of a camera to which the embodiment is applied.

FIG. 6 is a block diagram of a camera to which the color noise reduction device according to the embodiment is applied. A signal acquired by a sensor 40 is processed by a preprocessing unit 41, and is converted from Bayer data into YCbCr data in a color processing unit 42. The converted YCbCr data is subjected to color noise reduction by the color noise reduction device 43 to which the present embodiment is applied, and encoded at a PEG unit 44, and then stored in an external medium 47 through an external I/F unit 45 or displayed by a display device, such as an LCD 48, through a display unit 46.

In the presented embodiment, color noise reduction in the vertical direction is performed on the basis of the pixels that have been subjected to the color noise reduction filter in the horizontal direction. Further, after the color noise reduction method equivalent to the embodiment is applied in the vertical direction, color noise reduction in the horizontal direction may be performed.

In addition, the line buffer is limited to one line and then color noise reduction in the vertical direction is performed. Further, two or more lines of line buffers may be used to store the blend values in the line buffers.

Furthermore, only one-line line buffer is prepared to reduce color noise. Additionally, luminance noise may be reduced in a similar method. In addition, the blend ratio β of the luminance component is fixed, for example to 0.25. Still further, as in the case of the blend ratio of the color difference component, β may be made variable in response to the conditional branch in operation S15 in FIG. 3.

According to one aspect of the above described embodiment, a noise reduction device that does not generate a horizontal stripe of color difference signals is provided with low cost. Furthermore, according to one aspect of the above described embodiment, when a digital image is generated and noise occurs in color components, the roughness of color components to an image is reduced. All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A noise reduction device comprising:
   a line buffer that stores a blend value obtained by blending a pixel value stored in the line buffer with a processing target pixel value at a given ratio, wherein the line buffer stores by an amount of one line of pixels of an image, and wherein
   when the blend value is stored in the line buffer by an amount of one line for each of Cb data and Cr data, a ratio at which the blend value in the line buffer is blended with the target pixel value is varied on the basis of whether a color difference between the blend value in the line buffer and the target pixel value is less than a first threshold;
   a selector that selects the blend value when a difference between the blend value in the line buffer and the target pixel value is less than a second threshold, and that selects the target pixel value when the difference is greater than or equal to the second threshold, and
   a counter that counts the number of times the similar sign of the difference between the blend value in the line buffer and the target pixel value successively occurs, and wherein
   when it is determined on the basis of the counted result that the number of times a variation in pixel value successively occurs is greater than a set number of times, the blend value in the line buffer is discarded and the target pixel value is stored in the line buffer.

2. The noise reduction device according to claim 1, wherein
   among Y, Cb, and Cr data stored in the line buffer, a blend ratio of the blend value in the line buffer of Y data and the target pixel value of Y data is set at 0.25.

3. The noise reduction device according to claim 1, wherein
   luminance Y, color difference Cb and color difference Cr are separately counted when the number of times the similar sign of the difference between the blend value in the line buffer and the target pixel value successively occurs, and the blend value in the line buffer is discarded when a counter of the luminance Y exceeds a set value and any one of a counter of the color difference Cb and a counter of the color difference Cr exceeds a set value.

4. The noise reduction device according to claim 1, wherein
   filtering for noise reduction in a horizontal direction is carried out on an output value of the selector.

5. The noise reduction device according to claim 1, wherein
   the selector directly outputs a pixel value in regard to a luminance signal and outputs a selected value only in regard to a color difference signal.

6. A noise reduction method comprising:
   storing a blend value, obtained by blending a stored pixel value with a processing target pixel value at a given ratio, by an amount of one line of pixels of an image, wherein
   when the blend value is stored by an amount of one line for each of Cb data and Cr data, a ratio at which the blend value is blended with the target pixel value is varied on the basis of whether a color difference between the blend value and the target pixel value is less than a first threshold;
   selecting the blend value when a difference between the blend value and the target pixel value is less than a second threshold;
   selecting the target pixel value when the difference is greater than or equal to the second threshold; and
   counting the number of times the similar sign of the difference between the blend value and the target pixel value successively occurs, wherein
   when it is determined on the basis of the counted result that the number of times a variation in pixel value successively occurs is greater than a set number of times, the blend value is discarded and the target pixel value is stored.

* * * * *